United States Patent [19]
Murase et al.

[11] Patent Number: 5,897,106
[45] Date of Patent: Apr. 27, 1999

[54] SPRING ASSEMBLY AND POWER TRANSMISSION DEVICE USING THE SAME

[75] Inventors: Michinori Murase, Aichi; Hitoshi Ishikawa; Toshihiko Ishida, both of Kariya, all of Japan

[73] Assignees: Togo Seisakusyo Corporation; Aisin Seiki Kabushiki Kaisha, both of Aichi, Japan

[21] Appl. No.: 08/932,106

[22] Filed: Sep. 17, 1997

[30] Foreign Application Priority Data

Sep. 18, 1996 [JP] Japan .................................. 8-246668

[51] Int. Cl.⁶ .............................. E05F 11/46; F16H 27/02; F16F 1/34
[52] U.S. Cl. .............................. 267/161; 74/89.18; 49/351
[58] Field of Search .................................... 267/159, 160, 267/161, 162, 163, 164; 74/89.18, 89.19; 49/348–351

[56] References Cited

U.S. PATENT DOCUMENTS

| | | | |
|---|---|---|---|
| 2,023,035 | 12/1935 | Solenberger | 267/161 |
| 2,660,913 | 12/1953 | Frisby | 267/161 |
| 3,591,162 | 7/1971 | Bauer | 267/161 |
| 3,635,100 | 1/1972 | Littman | 74/411 |
| 3,851,533 | 12/1974 | Deuler | 74/89 |
| 4,338,747 | 7/1982 | Hess et al. | 49/349 |
| 4,723,456 | 2/1988 | Köhler et al. | |

FOREIGN PATENT DOCUMENTS

| | | |
|---|---|---|
| 60-54821 | 4/1985 | Japan . |
| 62-37489 | 2/1987 | Japan . |
| 63-6204 | 1/1988 | Japan . |

*Primary Examiner*—Chris Schwartz
*Attorney, Agent, or Firm*—Wenderoth, Lind & Ponak, L.L.P.

[57] ABSTRACT

A spring assembly comprising an inner ring spring and an outer ring spring suitable for use in a safety device for an automobile power window is provided. The inner ring spring is formed by substantially circularly bending a strip spring so that both ends thereof are away from each other and the outer ring spring is formed by substantially circularly bending a strip spring so that both ends thereof are away from each other, the outer ring spring being fitted with the inner ring spring. Stoppers are provided in the vicinity of one ends of the inner and outer ring springs respectively. Each stopper is engaged with the other end of other ring spring, thereby holding one end side of each ring spring in such a condition that one end side of each ring spring is resiliently abutted against one end side of other ring spring.

5 Claims, 7 Drawing Sheets

A

B

SPRING ASSEMBLY AND POWER TRANSMISSION DEVICE USING THE SAME

BACKGROUND OF THE INVENTION

1. Field of the Invention

This invention relates to a ring spring suitable for use in a safety device for an automobile power window, and a power transmission device using the ring spring.

2. Description of the Prior Art

A safety device has conventionally been incorporated in a power window for automotive vehicles to interrupt an ascending operation of a window glass when foreign matter is caught between the window glass and a window frame. FIG. 11 schematically illustrates one of such safety devices. A worm wheel 90 is connected to the side of a drive mechanism for ascending and descending the window glass. A drive shaft 94 is connected to the operation side, namely, a regulator (not shown) for the window glass. A rubber damper 91 and a metal plate 92 are disposed in the worm wheel 90. The drive shaft 94 extends through central holes of the worm wheel 90 and damper 91 to be loosely fitted in them, whereas it is tightly fitted in a central hole of the plate 92 for rotation therewith.

The worm wheel 90 is rotated when a drive device is turned on so that the power window is closed. The damper 91 in engagement with the worm wheel 90 is simultaneously rotated. Since engagement pieces 97 of the plate 92 are engaged with grooves 98 of the damper 91 respectively, the plate 92 is also rotated with the damper 91. The drive shaft 94 is thus rotated so that the window glass is ascended by the window regulator (not shown).

A drive motor is subjected to a large braking force when foreign matter is caught between the window glass and an upper edge of the window frame during ascent of the window glass. In this case, gear teeth of the worm wheel 90 would be chipped without the damper 91. As shown in FIG. 11, however, the damper 91 is interposed between the worm wheel 90 and the plate 92. When a rotor of the drive motor is locked, the damper 91 is deformed to be spread such that a phase shift occurs between the damper 91 and the plate 92 in the stopped state. In other words, part of the rotational energy of the worm wheel 90 is converted to energy deforming the damper 91 so that a damping force is obtained. Thus, the gear teeth of the worm wheel 90 can be prevented from being chipped. Suitable detecting means are provided for detecting a reduction in the rotational speed of the drive motor in mesh engagement with the worm wheel 90 due to the above-described energy conversion, thereby generating a signal. The signal is supplied to a control device, which delivers an output signal to interrupt or reverse-rotate the drive motor. Consequently, foreign matter can be prevented from being caught between the window glass and the window frame.

The performance of the drive motor is set so that the window glass can be ascended and descended even when the window glass is frozen. Accordingly, the damper 91 needs to provide a damping force necessary for absorbing shock due to the locked-rotor condition, for example, when the foreign matter has been caught between the window glass and the window frame or when the window glass has completely been closed up. To ensure the necessary damping force, the prior art has proposed to render the damper large in size. However, this cannot be adopted because of strong demand for space saving.

Furthermore, the damper needs to be fit for repeated use. Additionally it is desired that, the damper has a linear damping characteristic since the detection of abnormal conditions are based on differentials.

However, the conventional damper is made of rubber as described above. Accordingly, since the rubber damper is deteriorated or hardened due to long-time use, the damping force of the damper 91 is decreased relative to the rotational force of the worm wheel 90. Consequently, an expected performance cannot be achieved from the damper. This necessitates an early replacement of the damper.

Furthermore, it is difficult to obtain a large reaction force from a small rubber damper. Additionally, the rubber damper has a non-linear damping characteristic. Thus, the conventional rubber damper is not always suitable in view of the above-described usage thereof.

A damper comprising a metal spring has been proposed in order that the above-described problems may be solved. More specifically, the metal spring is generally less deteriorative than the rubber damper and has a linear damping characteristic. Thus, the above-described problems can be solved by the use of a metal damper.

The spring is bent into a ring spring in view of the shape and location of disposition of the safety device when incorporated in the safety device. In this case, the conventional safety device can be used without substantial alterations in design. Furthermore, the ring spring should be closed in its initial state with both free ends thereof being abutted against each other so that variations in the dimensions of products can be restrained by an effective use of the torque acting on the drive shaft.

However, when a single strip spring is bent into the shape of a closed ring, both ends thereof are opened by spring back. Consequently, the torque of the ring spring cannot efficiently be utilized.

However, both ends of a single strip spring may be bent into a ring spring in view of the spring back, as shown in FIGS. 9 and 10. FIG. 9 illustrates a ring spring 70 formed by bending a single strip spring. The ring spring 70 has notches 86 and 87 formed in both ends thereof respectively. Each of the notches 86 and 87 has a width half that of the ring spring 70. The ring spring 70 has tongues 73 and 74 formed on both ends thereof respectively. The distal ends of the tongues 73 and 74 serve as free ends and are bent into a U-shape so that abutment strips 71 and 72 are provided. The tongues 73 and 74 are formed to be located high and low respectively and complementary to each other in view of the spring back, as viewed in FIG. 9, whereupon the ring spring 70 can be designed so that the abutment strips 71 and 72 are abutted against each other.

FIG. 10 illustrates another ring spring 80 formed by bending a single strip spring. The ring spring 80 has at one end thereof one small strip 84 and two notches 88 which are formed in both sides of the ring spring and each of which has a width one third that of the ring spring. The ring spring 80 further has at the other end thereof two small strips 83 and a central notch 89 which has a width one third that of the ring spring. Ends of the three strips 83 and 84 serve as free ends and are bent into a U-shape so that abutment strips 81 and 82 are provided. Thus, the ring spring 80 can be formed by bending the strip spring so that the strips 83 and 84 and the notches 88 and 89 are complementary.

However, the torque of the ring spring 70 and 80 cannot efficiently be utilized, because each of the two ring springs 70 and 80 has notches 86, 87 and 88 in both ends

SUMMARY OF THE INVENTION

Therefore, an object of the present invention is to provide a spring wherein the torque thereof can efficiently be utilized and a power transmission device using the spring.

In a first aspect, the invention provides a spring assembly comprising an inner ring spring formed by substantially circularly bending a strip spring so that both ends thereof are away from each other and an outer ring spring formed by substantially circularly bending a strip spring so that both ends thereof are away from each other, the outer ring spring being fitted with the inner ring spring. Stoppers are provided in the vicinity of one ends of the inner and outer ring springs respectively. Each stopper is engaged with the other end of the other ring spring, thereby holding one end side of each ring spring in such a condition that said one end side of each ring spring is resiliently abutted against one end side of the other ring spring.

The inner and outer ring springs are engaged with each other so as to be integrated into the spring assembly. Since no fixing means such as welding is required, the inner and outer ring springs can readily be assembled. Furthermore, the normally closed spring assembly is provided. When the one ends of the inner and outer ring springs are opened, a torque according to an opening angle is obtained. Consequently, the spring assembly with stable spring characteristic can be produced.

In the above-described spring assembly, each of the inner and outer ring springs has at one end side an abutment strip bent toward a center thereof. The spring assembly can conveniently be held in the assembled state by the abutment strips. Furthermore, the stopper of the inner ring spring comprises a stepped portion having a height approximately equal to a thickness of the outer ring spring. The inner and outer ring springs are assembled together by the use of the stepped portion. Consequently, since a joint between the ring springs is smooth, the joint can be prevented from being caught by the gear side when the spring assembly is incorporated in the gear.

In a second aspect, the invention provides a power transmission device comprising a drive motor, an annular gear rotated by the drive motor, the gear having a central boss and an outer circumferential wall having two engagement portions formed on an inner face thereof, the spring assembly above according to the first aspect and accommodated in a circumferential groove defined between the central boss and the outer circumferential wall of the gear so that the spring engagement portions are held between the one ends of the inner and outer ring springs, a transmitting member rotated with the spring assembly and having two linkage portions held between the one ends of the inner and outer ring springs, and a shaft fixed to a center of the transmitting member so as to be rotated therewith. The spring assembly is deformed to be opened via the linkage portions depending on a magnitude of a force rotating the shaft. In a fourth aspect, the ring spring described above according to the second aspect is incorporated in the power transmission device instead of the ring spring in the third aspect. In each aspect, the power transmission device having a stable transmission characteristic can be produced.

BRIEF DESCRIPTION OF THE DRAWINGS

Other objects, features and advantages of the present invention will become clear upon reviewing the following description of preferred embodiments thereof, made with reference to the accompanying drawings, in which.

DETAILED DESCRIPTION OF THE PREFERRED EMBODIMENTS

Figure 1:
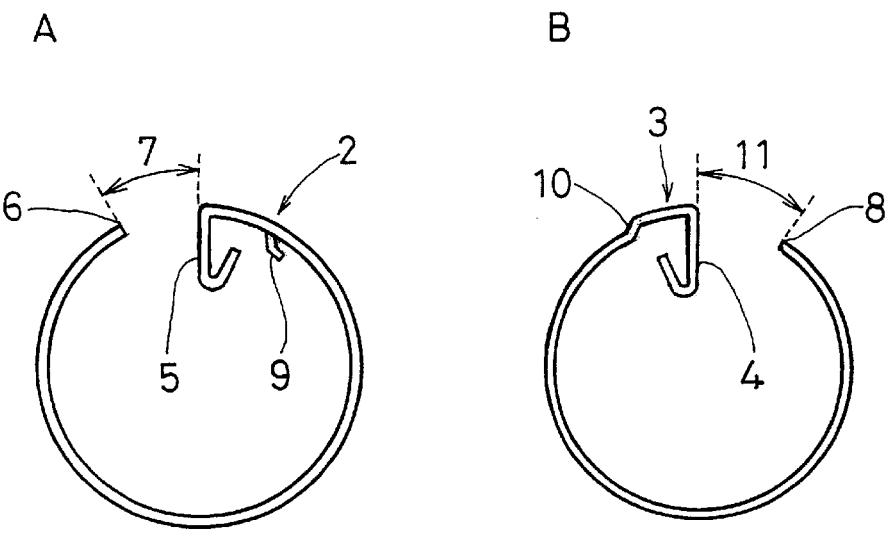
FIGS. 1A and 1B are side views of outer and inner ring springs in a first embodiment in accordance with the present invention respectively.
Figure 2:
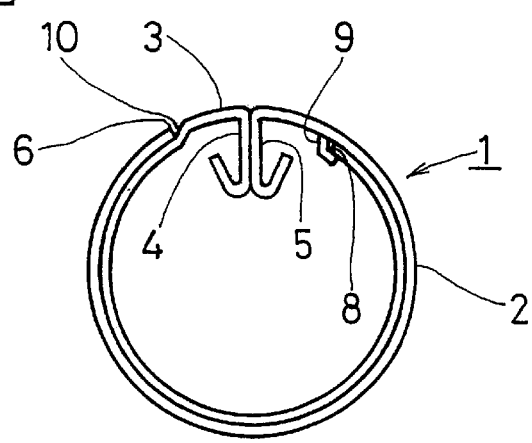
FIG. 2 is a side view of the assembled outer and inner ring springs.

A first embodiment of the present invention will be described with reference to FIGS. 1A to 6. Referring to FIGS. 1A and 1B, a spring assembly 1 comprises an outer ring spring 2 and an inner ring spring 3. Each of the ring springs are formed by bending a metal strip spring generally circularly. The outer and inner ring springs 2 and 3 have one ends 6 and 8 and the other ends bent toward the center thereof to be formed into abutment strips 4 and 5 and further bent at distal ends thereof into a U-shape, respectively.

The outer ring spring 2 has a diameter slightly larger than the inner ring spring 3 so that the outer ring spring can be attached closely to an outer circumferential side of the inner ring spring. In the normal state of the spring assembly 1, predetermined spaces 7 and 11 are defined between the ends 6 and 8 and ends of the abutment strips 4 and 5 opposed to the ends 6 and 8 respectively. In the embodiment, each of the spaces 7 and 11 is set at such a distance that the abutment strips 4 and 5 comes into contact with each other without pressing each other when the outer and inner ring springs 2 and 3 are assembled into the spring assembly 1. However, each of the spaces 7 and 11 may be set at such a distance that the abutment strips 4 and 5 are pressed to each other. The inner ring spring 3 has a stepped portion 10 formed near the abutment strip 4. The stepped portion 10 engages with the end 6 of the outer ring spring 2. The portion of the inner ring spring 3 between the stepped portion 10 and the abutment strip 4 has the same diameter as the circumferential face of the outer ring spring 2, whereupon the circumferential faces of the outer and inner ring springs 2 and 3 are continuous without steps when the ring springs are assembled into the spring assembly 1. The outer ring spring 2 has a hook-shaped claw 9 formed by inwardly cutting and turning down a portion thereof near the abutment strip 5. The claw 9 engages with the end 8 of the inner ring spring 3.

Thus, in the spring assembly 1 comprising the outer and inner ring springs 2 and 3, the stepped portion 10 and the claw 9 are engaged with the ends 6 and 8 of the outer and inner ring springs 2 and 3 respectively so that the spring assembly 1 is resiliently deformable between the closed state and the open state with the abutment strips 4 and 5 away from each other.

Figure 6:
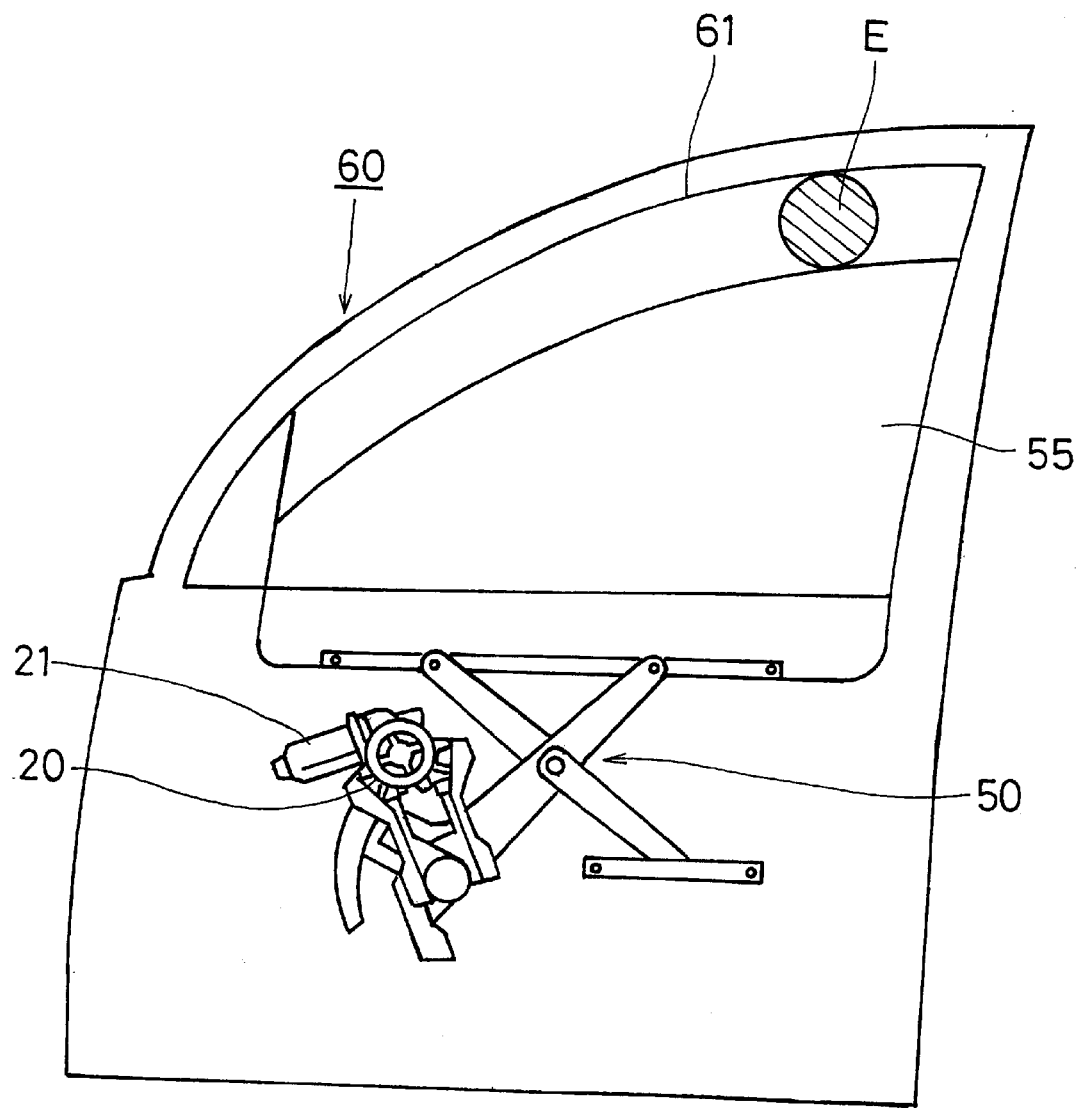
FIG. 6 is a side section of an automobile door on which the safety device incorporating the spring assembly of the embodiment is mounted.

The above-described spring assembly 1 can be applied to a safety device for an automobile power window, for example. FIG. 6 illustrates a drive mechanism for the automobile power window. A window regulator 50 comprising a linkage is connected to a lower portion of a window glass 55. The window regulator 50 is bent and stretched to thereby ascend and descend a window glass 55. A reversible motor 21 serving as a drive source for the window regulator 50 is built in a door panel 60. A safety device 20 is connected between the motor 21 and the window regulator 50 to cope with a case where a foreign matter E has been caught between the window glass 55 and a window frame 61 during the ascent of window glass.

Figure 5:
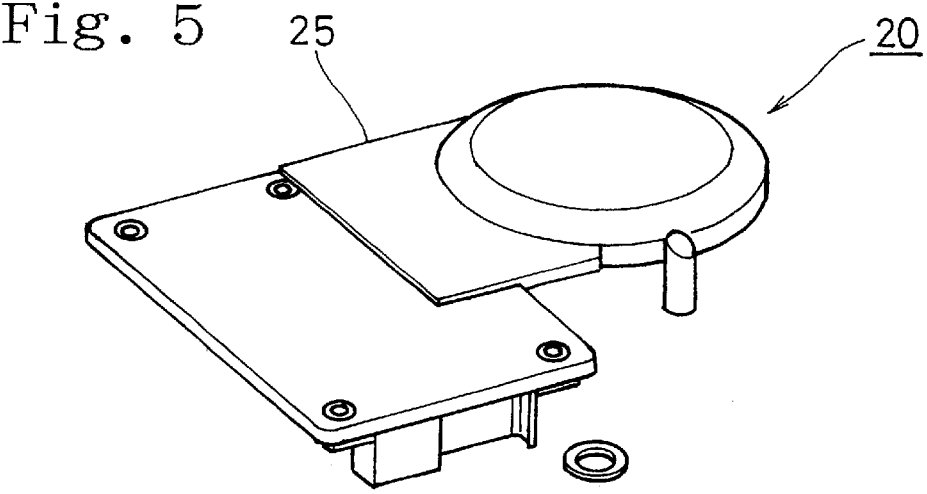
FIG. 5 is an exploded perspective view of the safety device for the power window.
Figure 5:
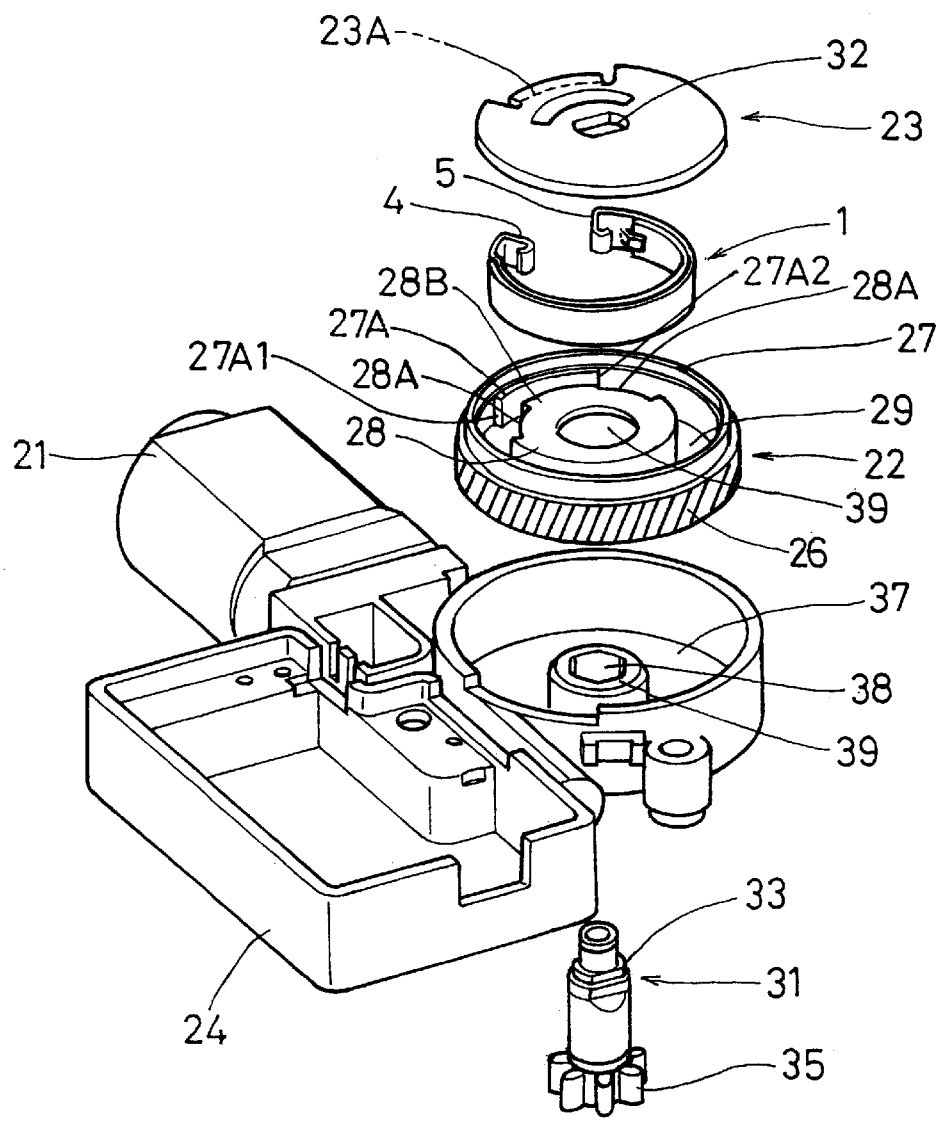

Referring to FIG. 5, the safety device 20 is accommodated in a ring case 37 of a housing 24 provided with the motor 21. The housing 24 is covered by a cover 25. The ring case 37 has a central boss 39 having a central through hole 38 through which a drive shaft 31 is inserted. The drive shaft 31 has a pinion gear 35 on one end thereof. The pinion gear 35 is engaged with a gear (not shown) of the window regulator 50 side to thereby actuate the window regulator.

A worm wheel 22 is first accommodated in the ring case 37 to be rotatably fitted with the boss 39. The worm wheel 22 is made of a synthetic resin and engaged with a worm connected to a rotational shaft of the motor 21, which worm and shaft are not shown. The worm wheel 22 has a central disc-shaped swollen portion or boss 28. A ring-shaped accommodation groove 29 is defined between the boss 28 and an outer circumferential wall of the worm wheel 22. The spring assembly 1 is to be accommodated in the accommodation groove 29. The worm wheel 22 has an outer protrusion 27A protruding from an inner face of the outer circumferential wall thereof and circumferentially extending in a predetermined angular range. The boss 28 has an inner protrusion 28B formed thereon to correspond to the outer protrusion 27A. The inner protrusion 28B is formed by cutting out two outer circumferential portions of the swollen portion 28 by respective predetermined angles so that the cut-out portions serve as symmetric escape recesses 28A. Both ends of the outer protrusion 27A serve as spring engagement portions 27A1 and 27A2 respectively. Both ends of the inner protrusion 28B also serve as spring engagement portions 28B1 and 28B2 respectively. These spring engagement portions 27A1, 27A2, 28B1 and 28B2 are held between the abutment strips 4 and 5 when the spring assembly 1 is incorporated in the worm wheel 22. Furthermore, the escape recesses 28A guide the distal end of the abutment strips 4 and 5 when the ring springs 2 and 3 of the spring assembly 1 are opened clockwise and counterclockwise respectively as viewed in FIG. 5. Accordingly, since the spring assembly 1 is already slightly opened before incorporated into the worm wheel 22, it is incorporated into the worm wheel 22 under pressure.

Figure 3:
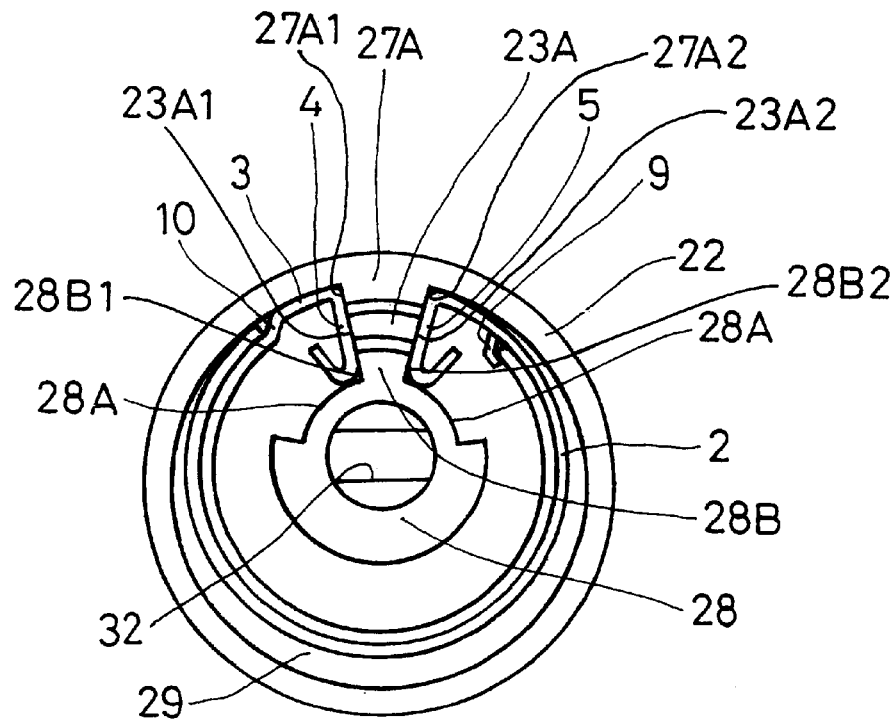
FIG. 3 is a side section of the spring assembly incorporated in the safety device for the automobile power window.
Figure 4:
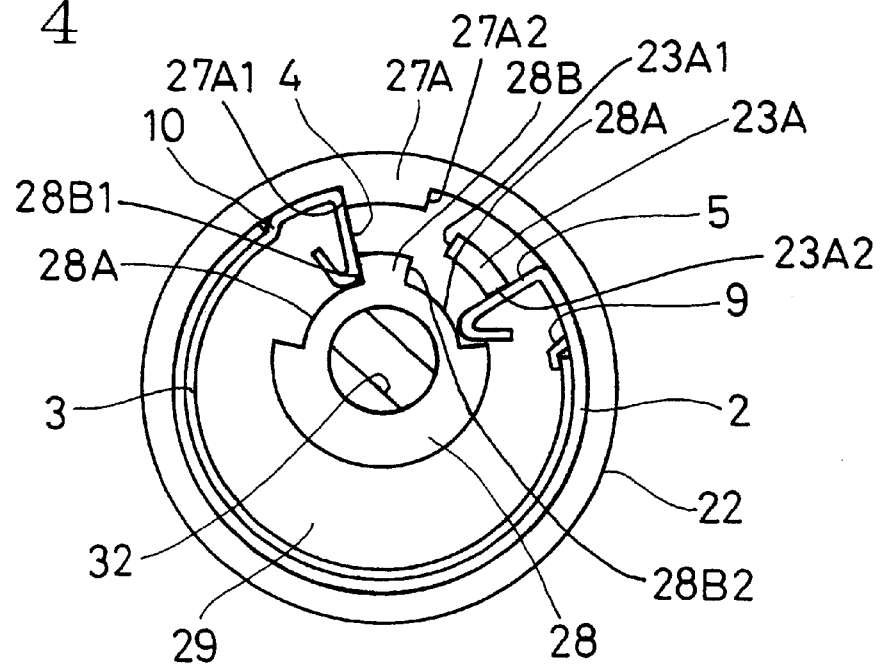
FIG. 4 is a side section of the spring assembly in an open state.

A tension plate 23 serving as a transmitting member is accommodated in the ring case 37 so as to be disposed on an upper face of the spring assembly 1. The tension plate 23 has a generally oval mounting hole 32 formed in the center thereof. The mounting hole 32 is fitted with a generally oval connecting portion 33 of the drive shaft 31 so that the tension plate 23 is co-rotated with the drive shaft 31. The tension plate 23 is made of a metal and has an engagement edge 23A formed by bending a part of its outer circumferential edge approximately at a right angle. The engagement edge 23A has both ends serving as linkage portions 23A1 and 23A2 respectively. The linkage portions 23A1 and 23A2 are normally located between the outer and inner protrusions 27A and 28B and between the abutment strips 4 and 5, as shown in FIGS. 3 and 4. When a relative angular displacement occurs between the pinion gear 35 and the worm wheel 22, either linkage portion 23A1 or 23A2 pushes the corresponding abutment strip, thereby opening the spring assembly 1.

The safety device includes means (not shown) for detecting the above-described relative angular displacement between the pinion gear 35 and the worm wheel 22. The detecting means is connected to a control device (not shown) to deliver a signal to the latter. Based on the signal from the detecting means, the control device reverses the motor 21.

The operation of the safety device 20 will now be described with reference to FIGS. 3 and 4. The spring assembly 1 is accommodated in the groove 29 of the worm wheel 22 in a slightly opened state as shown in FIG. 3. In this normal state, the abutment strips 4 and 5 are abutted against the spring engagement portions 27A1 and 27A2, and 28B1 and 28B2 of the outer and inner protrusions 27 and 28 with pressures applied in the closing direction. The worm wheel 22 is rotated when the motor 21 is driven so that the window glass 55 located at a lower dead center is ascended, for example. The spring assembly 1 accommodated in the worm wheel 22 acts on the tension plate 23 in the normal state. Accordingly, the tension plate 23 co-rotates with the worm wheel 22. With this, the drive shaft 31 also co-rotates so that the window glass 55 is ascended by the window regulator 50. Thus, the window glass 55 is ascended and descended without the displacement of the spring assembly 1 in the opening direction when no abnormal condition occurs during operation of the power window.

FIG. 6 illustrates the condition where the foreign matter E is inadvertently caught between the upper end of the window glass 55 and the window frame 61 while the window glass is being ascended. The window regulator 50 cannot continue ascending when the foreign matter E has thus been caught. Accordingly, the rotating drive shaft 31 is braked. Then, the tension plate 23 co-rotating with the drive shaft 31 also stops rotating. On the other hand, the motor 21 continues rotating in this while and accordingly, the worm wheel 22 also continues rotating. Consequently, a variation occurs between rotation of the worm wheel 22 and that of the tension plate 23 and simultaneously, a phase shift occurs between the worm wheel 22 and the pinion gear 35. The phase shift is detected by the detecting means (not shown), which delivers the signal to the control device. Based on the signal from the detecting means, the control device interrupts and further reverses the motor 21 for a predetermined time so that the window glass 55 is descended. Thus, the catch of foreign matter E can be solved.

Furthermore, the linkage portion 23A1 pushes the corresponding abutment strip (the strip 5 in FIG. 4) with rotation of the worm wheel 22 upon occurrence of the above-described phase shift, thereby opening the spring assembly 1. In this case, the abutment strip 5 is moved within the set angular range of the recess 28A. Since the spring assembly 1 is adapted to remain in an allowable angular range, a force urging the spring assembly in the closing direction is approximately in proportion to the opening angle thereof. Accordingly, even when a large braking force acts on the motor 21 due to, for example, a foreign matter caught between the window glass and the window frame, a resultant shock is absorbed by the spring assembly 1. Consequently, the gear teeth of the worm wheel 22 can reliably be prevented from being chipped. Furthermore, the spring assembly 1 is operated in the same manner as described above upon occurrence of an abnormal condition during the descent of the window glass 55, though the safety device 20 is rotated in the opposite direction.

According to the foregoing embodiment, the abutment strips 4 and 5 of the strip springs 2 and 3 are abutted against each other. Even when a single spring is bent into the shape of a ring, it is difficult to abut the free ends thereof against each other on the same plane due to the spring back. In the embodiment, however, the two ring springs 2 and 3 are combined together in view of the spring back so that the free ends or abutment strips 4 and 5 thereof can be abutted against each other. Thus, since the spring assembly 1 is normally closed, the variations in the dimensions of products can be prevented and accordingly, the ring springs with the stable spring characteristic can be produced.

Furthermore, the two ring springs 2 and 3 are engaged with each other to be integrated into the spring assembly 1. Thus, the spring assembly can readily be assembled. Additionally, the ring springs 2 and 3 are laid one upon the other substantially over their entire circumference. Consequently, the spring constant of the spring assembly 1 can be rendered approximately twice as large as that of the single ring spring although the spring assembly is small in size. Furthermore, the above-described spring assembly is superior in the durability to the conventional rubber damper and can provide the stable spring characteristic for a long period.

Figure 7:
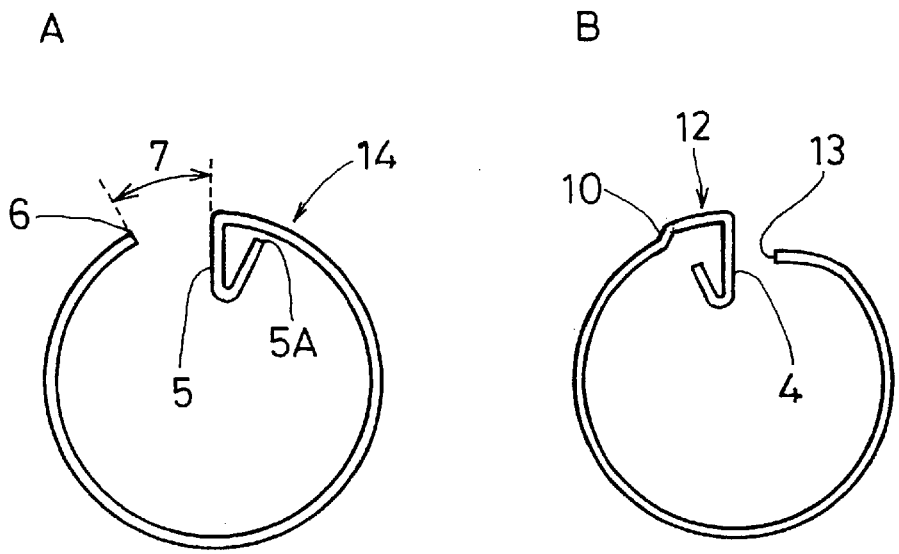
FIGS. 7A and 7B are side views of outer and inner ring springs in a second embodiment in accordance with the present invention respectively.
Figure 8:
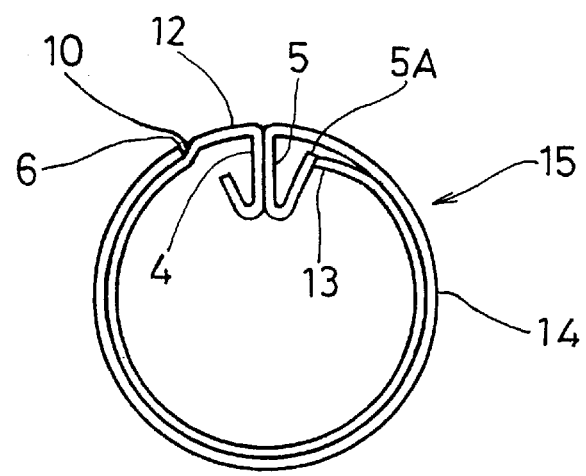
FIG. 8 is a side view of the assembled outer and inner ring springs.
Figure 9:
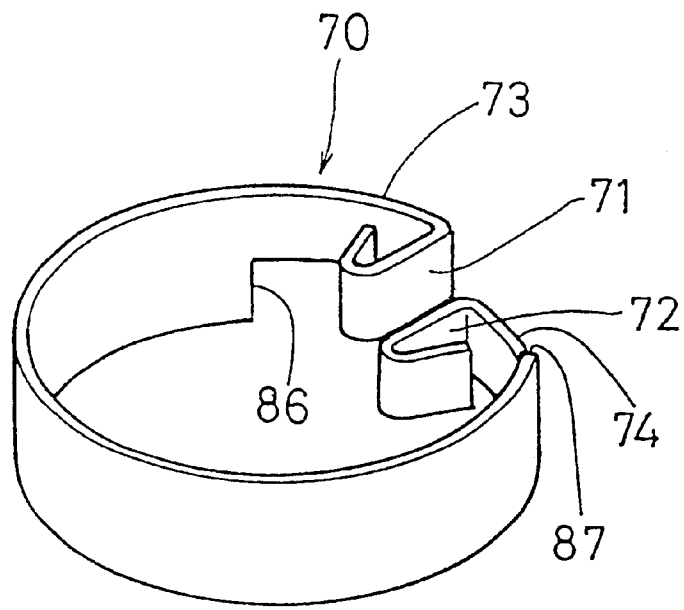
FIG. 9 is a perspective view of a conventional ring spring formed by bending a single strip spring.
Figure 10:
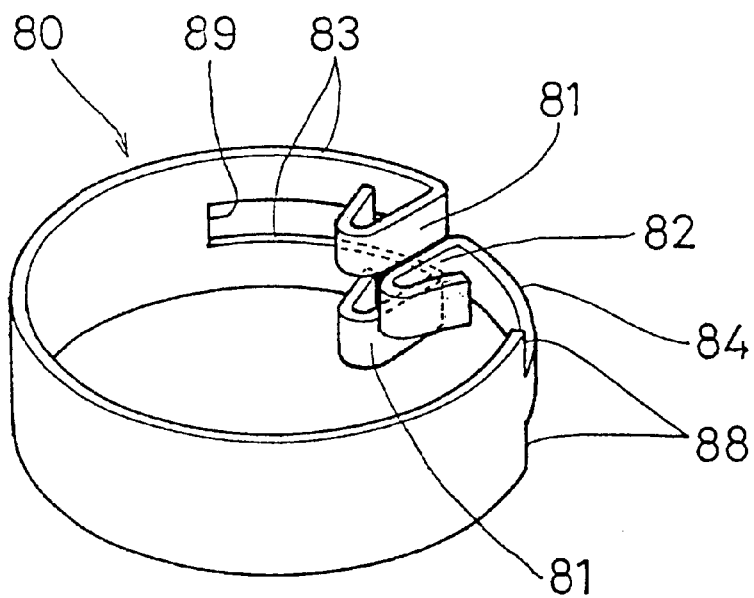
FIG. 10 is a perspective view of another conventional ring spring formed by bending a single strip spring.
Figure 11:
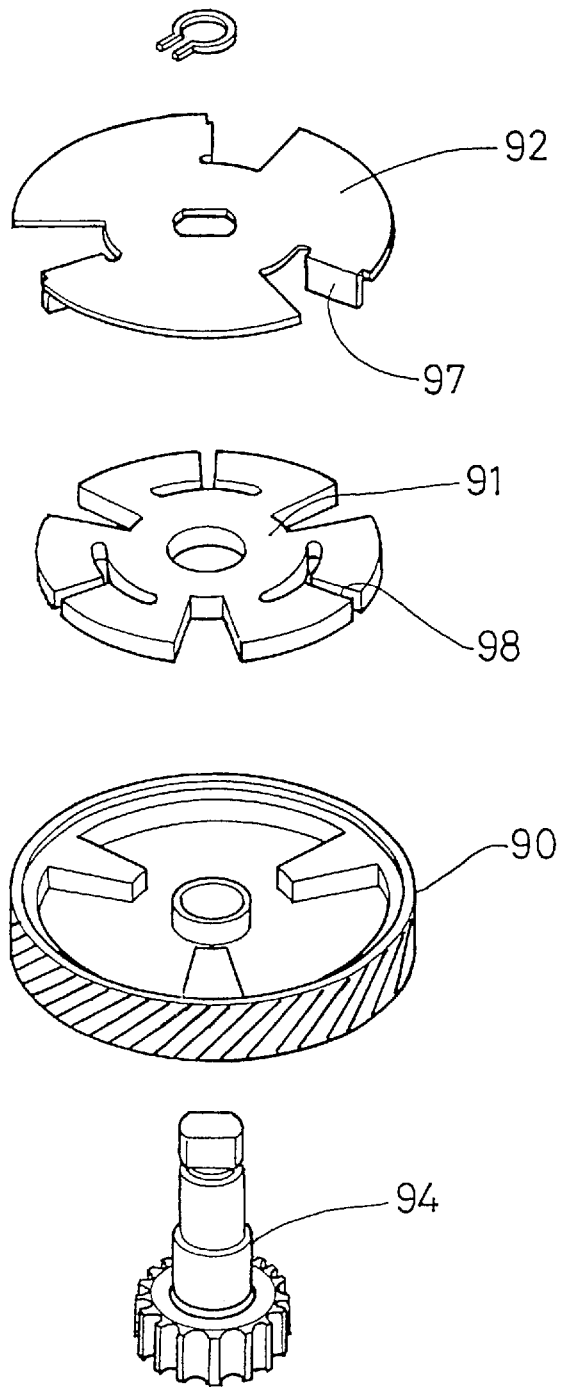
FIG. 11 is an exploded perspective view of a conventional safety device for the automobile power window.

FIGS. 7A to 8 illustrate a second embodiment of the present invention. The second embodiment differs from the foregoing embodiment in the structure of the end 13 of the inner ring spring 12. Identical parts are labeled by the same reference symbols in the second embodiment as in the first embodiment, and the description of these parts is eliminated.

The end 13 of the inner ring spring 12 is slightly inwardly deflected as shown in FIG. 7B. The outer ring spring 14 has no claws. Instead, the folded distal end of the abutment strip 5 against which the end 13 of the inner ring spring 12 is abutted is rendered longer to serve as an abutment end 5A, as shown in FIG. 7A.

The inner and outer ring springs 12 and 14 constructed as described above are combined together into the spring assembly 15, whereupon the end 13 of the inner ring spring 12 is abutted against the abutment end 5A of the outer ring spring 14. The same effect can be obtained from the above-described construction as from the first embodiment. Furthermore, since no claws are necessary, the outer ring spring 14 can readily be formed.

The end 13 of the inner ring spring 12 is abutted against the abutment end 5A of the outer ring spring 14, as described above. Accordingly, the spring assembly 15 comprising the inner and outer ring springs 12 and 14 is more circular as compared with the spring assembly 1 of the first embodiment. More specifically, a force acting to return the spring assembly 15 when it has been deformed in the opening direction has a more linear characteristic with respect to the opening angle.

Although the spring assembly is used in the safety device of the automobile power window in the foregoing embodiments, the spring assembly may be used in many cases where shock needs to be absorbed. The two strip springs are combined together into the spring assembly in the foregoing embodiments. However, three or more strip springs may be engaged with one another or welded into a circular shape. Although the abutment end 5A of the outer ring spring 14 is inwardly bent in the second embodiment, it may be bent outward. Furthermore, the shape of the abutment strip 5 may be varied.

The foregoing description and drawings are merely illustrative of the principles of the present invention and are not to be construed in a limiting sense. Various changes and modifications will become apparent to those of ordinary skill in the art. All such changes and modifications are seen to fall within the true spirit and scope of the invention as defined by the appended claims.

We claim:

1. A spring assembly comprising:
   an inner ring spring formed by substantially circularly bending a strip spring so that both ends thereof are away from each other;
   an outer ring spring formed by substantially circularly bending a strip spring so that both ends thereof are away from each other, the outer ring spring being fitted with the inner ring spring; and
   stoppers provided in the vicinity of one of the ends of the inner and outer ring springs respectively, each stopper being engaged with an opposite end of the other ring spring, thereby holding one end side of each ring spring in such a condition that said one end side of each ring spring is resiliently abutted against said one end side of the other ring spring.

2. A spring assembly according to claim 1, wherein each of the inner and outer ring springs has at said one end side an abutment strip bent toward a center thereof.

3. A spring assembly according to claim 1, wherein the stopper of the inner ring spring comprises a stepped portion having a height approximately equal to a thickness of the outer ring spring.

4. A spring assembly according to claim 2, wherein the stopper of the inner ring spring comprises a stepped portion having a height approximately equal to a thickness of the outer ring spring.

5. A power transmission device comprising:
   a drive motor;
   an annular gear rotated by the drive motor, the gear having a central boss and an outer circumferential wall having two spring engagement portions formed on an inner face thereof;
   a spring assembly comprising:
      an inner ring spring formed by substantially circularly bending a strip spring so that both ends thereof are away from each other;
      an outer ring spring formed by substantially circularly bending a strip spring so that both ends thereof are away from each other, the outer ring spring being fitted with the inner ring spring, each of the inner and outer ring springs having at one end side an abutment strip bent toward a center thereof; and
      stoppers provided in the vicinity of one ends of the inner and outer ring springs respectively, each stopper being engaged with an opposite end of other ring spring, thereby holding one end side of each ring spring in such a condition that said one end side of each ring spring is resiliently abutted against said one end side of other ring spring, the stopper of the inner ring spring comprising a stepped portion having a height approximately equal to a thickness of the outer ring spring;
   the spring assembly being accommodated in a circumferential groove defined between the central boss and the outer circumferential wall of the gear so that the spring engagement portions of the gear are held between the one ends of the inner and outer ring springs resiliently abutted against each other;
   a transmitting member rotated with the spring assembly and having two linkage portions held between the one ends of the spring assembly; and
   a shaft fixed to a center of the transmitting member so as to be rotated therewith; and
   wherein the spring assembly is deformed to be opened via the linkage portions depending on a magnitude of a force rotating the shaft.

* * * * *